(12) United States Patent
Toeda et al.

(10) Patent No.: US 11,758,545 B2
(45) Date of Patent: Sep. 12, 2023

(54) BASE STATION AND STATE CONTROL METHOD

(71) Applicant: NTT DOCOMO, INC., Tokyo (JP)

(72) Inventors: Teruaki Toeda, Tokyo (JP); Anil Umesh, Tokyo (JP); Tooru Uchino, Tokyo (JP); Akihito Hanaki, Tokyo (JP); Hiroshi Ou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 104 days.

(21) Appl. No.: 16/652,330

(22) PCT Filed: Nov. 17, 2017

(86) PCT No.: PCT/JP2017/041570
§ 371 (c)(1),
(2) Date: Mar. 30, 2020

(87) PCT Pub. No.: WO2019/097701
PCT Pub. Date: May 23, 2019

(65) Prior Publication Data
US 2020/0236658 A1    Jul. 23, 2020

(51) Int. Cl.
*H04W 52/00* (2009.01)
*H04W 72/23* (2023.01)
(Continued)

(52) U.S. Cl.
CPC ....... *H04W 72/23* (2023.01); *H04W 52/0212* (2013.01); *H04W 76/28* (2018.02)

(58) Field of Classification Search
CPC ......... H04W 52/0212; H04W 52/0229; H04W 56/0045; H04W 72/042; H04W 76/15; H04W 76/25
See application file for complete search history.

(56) References Cited

U.S. PATENT DOCUMENTS 6,925,092 B1 *   8/2005   Derks ................... H04L 65/65
                                                       348/467
2017/0264400 A1 *   9/2017   Nigam ................ H04L 5/0035
(Continued)

FOREIGN PATENT DOCUMENTS

JP   2016-046599 A   4/2016

OTHER PUBLICATIONS

International Search Report issued in PCT/JP2017/041570 dated Feb. 6, 2018 (3 pages).
(Continued)

*Primary Examiner* — Abdelillah Elmejjarmi
(74) *Attorney, Agent, or Firm* — Osha Bergman Watanabe & Burton LLP

(57) ABSTRACT

In one aspect of the present invention, a first base station for communicating with user equipment together with a second base station according to dual connectivity includes a data storage unit configured to store data to be transmitted from the first base station to the user equipment; a reception unit configured to receive from the second base station information indicating whether data to be transmitted from the second base station to the user equipment exist; and a state control unit configured to, when information indicating that data to be transmitted from the second base station to the user equipment exist is received, prevent the user equipment from releasing a radio resource or transitioning to a discontinuous reception state, even if the amount of to-be-transmitted data stored in the data storage unit is less than or equal to a predetermined threshold.

5 Claims, 8 Drawing Sheets

(51) Int. Cl.
*H04W 76/28* (2018.01)
*H04W 52/02* (2009.01)

(56) References Cited

U.S. PATENT DOCUMENTS

2017/0359850 A1* 12/2017 Loehr .................. H04W 72/042
2020/0169922 A1*  5/2020 Ozturk ................. H04W 36/08
2020/0196232 A1*  6/2020 Drevö .................. H04W 76/15

OTHER PUBLICATIONS

Written Opinion of the International Searching Authority issued in PCT/JP2017/041570 dated Feb. 6, 2018 (4 pages).

ZTE Corporation; "Inactive mode handling in NSA"; 3GPP TSG-RAN WG2 Meeting #99, R2-1708135; Berlin, Germany; Aug. 21-25, 2017 (4 pages).

3GPP TS 38.425 V0.2.0; "3rd Generation Partnership Project; Technical Specification Group Radio Access Network; NG Radio Access Network (NG-RAN); Xn interface user plane protocol (Release 15)"; Oct. 2017 (16 pages).

\* cited by examiner

FIG.7

| Bits | | | | | | | | Number of Octets |
|---|---|---|---|---|---|---|---|---|
| 7 | 6 | 5 | 4 | 3 | 2 | 1 | 0 | |
| | PDU Type (=0) | | | spare | | Data exists Ind. | Report polling | 1 |
| 5G-U Sequence Number | | | | | | | | 3 |
| Spare extension | | | | | | | | 0-4 |

BASE STATION AND STATE CONTROL METHOD

TECHNICAL FIELD

The present invention relates to a base station and a state control method.

BACKGROUND ART

In Third Generation Partnership Project (3GPP), standards of a new radio communication system referred to as New Radio Access Technology (NR) system are currently under discussion as a successor of a Long Term Evolution (LTE) system or an LTE-Advanced system.

In the NR system, it is expected that LTE-NR dual connectivity (LTE-NR DC) or multi-RAT dual connectivity (MR DC) will be introduced, where data are divided between an LTE base station (eNB) and an NR base station (gNB), and then the divided data are simultaneously transmitted or received by these base stations, as with dual connectivity in an LTE system (see Non-Patent Document 1). As illustrated in FIG. 1, for example, in LTE-NR DC, downlink data for user equipment (UE) are allocated to an LTE base station (eNB) and an NR base station (gNB) via an X2 interface or an Xn interface, and then the data are simultaneously transmitted from these base stations to the user equipment.

Further, as illustrated in FIG. 2, dual connectivity among NR systems is also under discussion. Specifically, downlink data for user equipment (UE) are allocated by an NR base station (central unit (CU)) to a plurality of base stations (distributed units (DUs)) via an F1 interface, and then the data are simultaneously transmitted from these base stations to the user equipment.

PRIOR-ART DOCUMENTS

Non-Patent Document

[Non-Patent Document 1] 3GPP TS38.425 V0.2.0 (2017-10)

DISCLOSURE OF INVENTION

Problem(s) to be Solved by the Invention

In a radio communication system, timing advance (TA) control is performed in order to adjust timing between a base station and user equipment. According to TA control, the user equipment releases a radio resource, when a TA command is not received.

Further, discontinuous reception (DRX) control is also performed in order to save battery consumption of user equipment or the like. According to DRX control, the user equipment transitions to a DRX state, when data are not transmitted or received between a base station and the user equipment for a long time.

In dual connectivity, TA control and DRX control are performed independently between each base station and user equipment. For this reason, even if data are transmitted or received between one base station and user equipment, it may be possible that a radio resource is released or the user equipment transitions to a DRX state on the part of another base station. In this situation, when data to be transmitted from both the base stations to the user equipment are generated, it is necessary to transition to a state in which the user equipment can receive the data, which consequently causes data transmission delay.

It is an object of the present invention to reduce data transmission delay caused by TA control and DRX control performed independently between each base station and user equipment in dual connectivity.

Means for Solving the Problem(s)

In one aspect of the present invention, there is provision for a first base station for communicating with user equipment together with a second base station according to dual connectivity, including:

a data storage unit configured to store data to be transmitted from the first base station to the user equipment;

a reception unit configured to receive from the second base station information indicating whether data to be transmitted from the second base station to the user equipment exist; and a state control unit configured to, when information indicating that data to be transmitted from the second base station to the user equipment exist is received, prevent the user equipment from releasing a radio resource or transitioning to a discontinuous reception state, even if the amount of to-be-transmitted data stored in the data storage unit is less than or equal to a predetermined threshold.

Advantageous Effect of the Invention

According to the present invention, it is possible to reduce data transmission delay caused by TA control and DRX control performed independently between each base station and user equipment in dual connectivity.

BRIEF DESCRIPTION OF THE DRAWINGS

FIG. 7 is a diagram illustrating an example of a data format used to exchange information between base stations in a radio communication system according to an embodiment of the present invention.

DETAILED DESCRIPTION OF THE PREFERRED EMBODIMENTS

Embodiments of the present invention are described below based on the drawings.

<Overview of Radio Communication System>

The following embodiments disclose a base station which supports distributed communication between base stations, in other words, dual connectivity such as LTE-NR dual connectivity, inter-DU dual connectivity, and so on.

Figure 1:
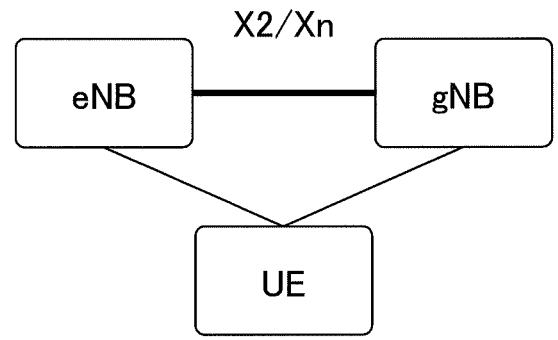
FIG. 1 is a schematic diagram illustrating LTE-NR dual connectivity.
Figure 2:
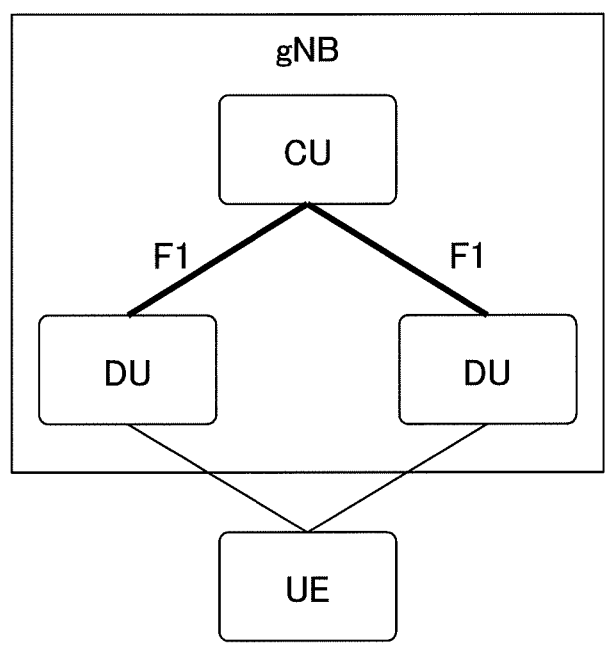
FIG. 2 is a schematic diagram illustrating inter-DU dual connectivity.
Figure 3:
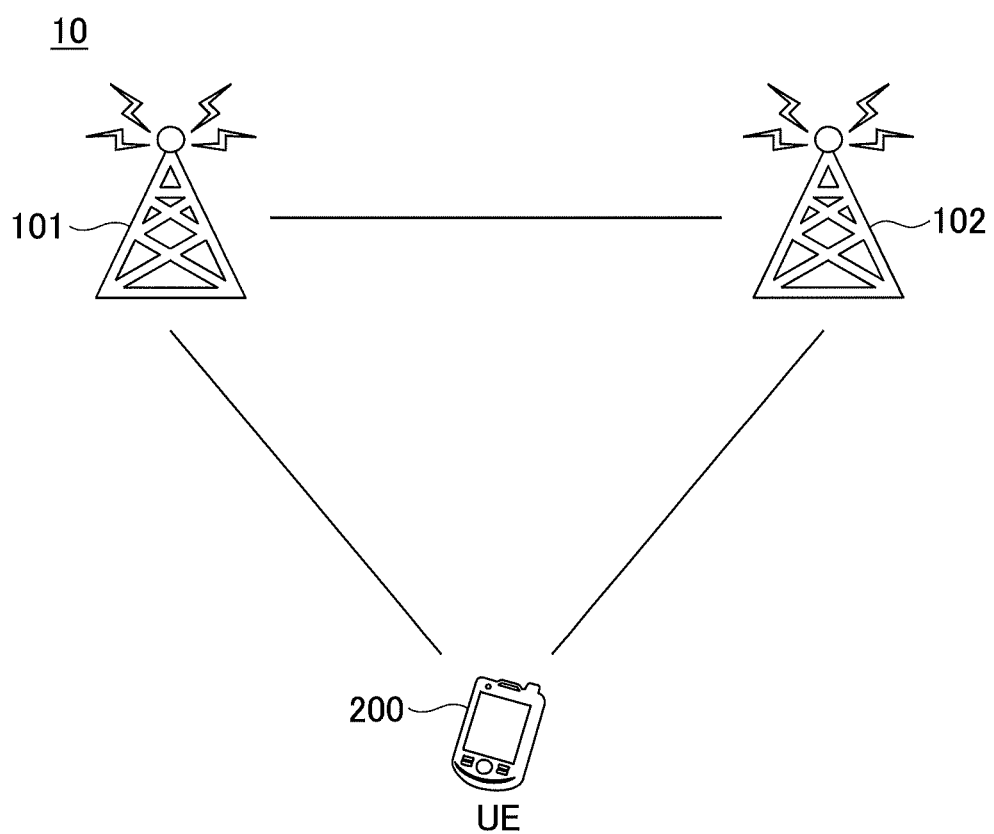
FIG. 3 is a schematic diagram illustrating a radio communication system according to an embodiment of the present invention.

With reference to FIG. 3, a radio communication system according to an embodiment of the present invention is described. FIG. 3 is a schematic diagram illustrating a radio communication system according to an embodiment of the present invention.

As illustrated in FIG. 3, user equipment 200 communicatively accesses base stations 101 and 102 (which may be hereinafter referred to as base stations 100) of an LTE system and/or an NR system and supports dual connectivity with the base stations 101 and 102. In other words, the user equipment 200 can simultaneously transmit/receive divided data to/from the base stations 101 and 102 by simultaneously using a plurality of component carriers provided by the base stations 101 and 102.

For example, in LTE-NR dual connectivity, downlink data to be transmitted from a core network (not illustrated) to the user equipment 200 are allocated to base stations 101 and 102 via an X2 interface or an Xn interface, and then transmitted from each of the base stations 101 and 102 to the user equipment 200. In inter-DU dual connectivity, downlink data to be transmitted from a core network (not illustrated) to the user equipment 200 are allocated by the base station 100 functioning as a CU to the base stations 101 and 102 functioning as a DU via an F1 interface, and then transmitted from each of the base stations 101 and 102 to the user equipment 200. The embodiment of the present invention is not limited to LTE-NR dual connectivity and inter-DU dual connectivity as described above, and is also applicable to any suitable distributed communication or dual connectivity including a combination of LTE-NR dual connectivity and inter-DU dual connectivity, dual connectivity using three or more nodes, dual connectivity between a radio communication system not complying with 3GPP and a radio communication system complying with 3GPP, and so on. As an example of dual connectivity using three or more nodes or multi-connectivity, distributed communication between an LTE base station (eNB) and NR base stations (CU and DU) may be used. Through the specification, the term "dual connectivity" covers distributed communication using three or more nodes or multi-connectivity as described above.

In the illustrated embodiment, the radio communication system 10 includes only two base stations 101 and 102, but a plurality of base stations 100 are typically installed to cover service areas of the radio communication system 10.

In dual connectivity, TA control is independently performed between each of the base stations 101 and 102 and the user equipment 200. In other words, the base station 101 periodically transmits a TA command to the user equipment 200, and the user equipment 200 controls transmission timing for the base station 101 based on the TA command. When transmission timing control is not needed, the user equipment 200 releases a radio resource associated with the base station 101. Similarly, the base station 102 periodically transmits a TA command to the user equipment 200, and the user equipment 200 controls transmission timing for the base station 102 based on the TA command. When transmission timing control is not needed, the user equipment 200 releases a radio resource associated with the base station 102. Specifically, the user equipment 200 resets a TA timer each time the user equipment 200 receives a TA command. When the TA timer expires, the user equipment 200 releases a radio resource for a physical uplink control channel (PUCCH), a sounding reference signal (SRS), or the like.

Further, in dual connectivity, DRX control is independently performed between each of the base stations 101 and 102 and the user equipment 200. In other words, the user equipment 200 manages a time period during which data transmission/reception to/from the base station 101 is not performed by means of a DRX timer. When the DRX timer expires, a communication state associated with the base station 101 is transitioned to a DRX state. Similarly, the user equipment 200 manages a time period during which data transmission/reception to/from the base station 102 is not performed by means of a DRX timer. When the DRX timer expires, a communication state associated with the base station 102 is transitioned to a DRX state. Specifically, the user equipment 200 checks whether downlink control information for the user equipment 200 exists on a downlink control channel (PDCCH), and resets the DRX timer each time the user equipment 200 receives downlink control information for the user equipment 200. When the DRX timer expires, the user equipment 200 transitions to the DRX state.

Figure 4:
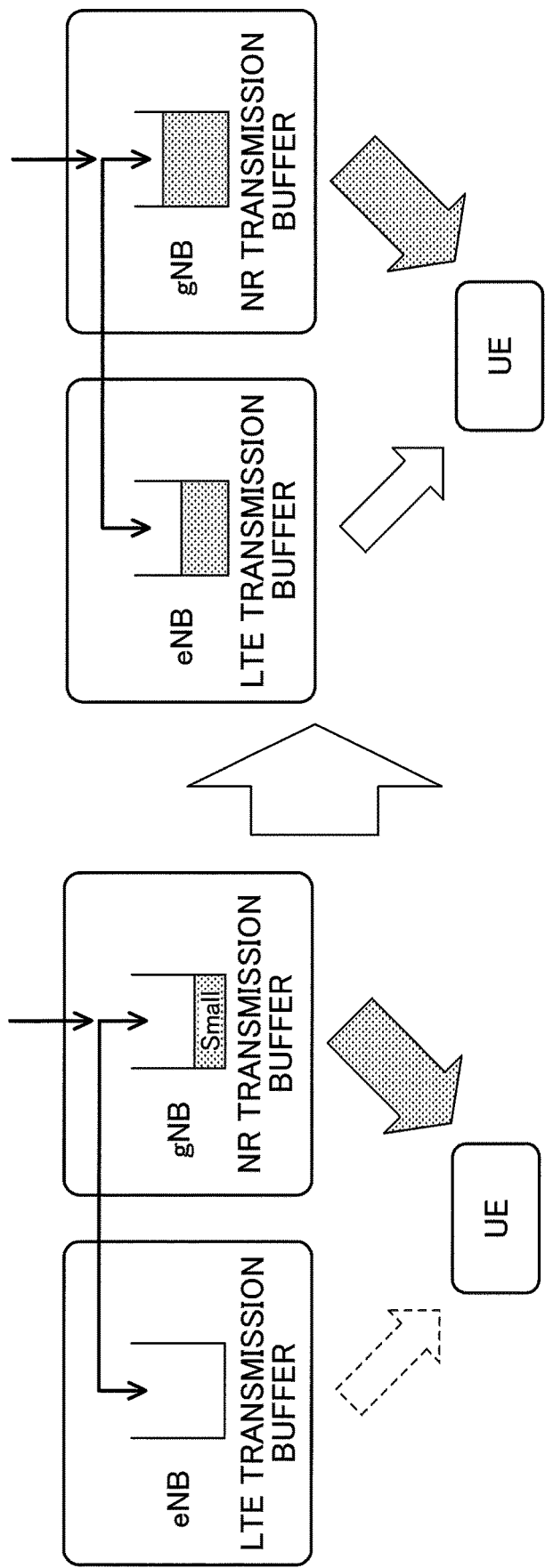
FIG. 4 is a diagram illustrating an example where data transmission delay is caused in dual connectivity.

Each of the base station 101 and 102 can identify the state of the user equipment by transmitting a TA command and downlink control information. With reference to FIG. 4, a problem caused by independently-performed TA control and DRX control is described in detail below. As an example, it is assumed that one base station 101 is an LTE base station (eNB), the other base station 102 is an NR base station (gNB), and the gNB allocates data to the eNB. However, the present invention is not limited to this example, but is also applicable to the case where the eNB allocates data to the gNB or the case where data are allocated to DUs in the gNB.

Each of the eNB and the gNB transmits to-be-transmitted data stored in a transmission buffer to the UE. As illustrated in the left side of FIG. 4, when there are no data to be transmitted to the UE in the transmission buffer (illustrated as an LTE transmission buffer in FIG. 4) of the eNB, the eNB stops data transmission to the UE. When the UE does not receive downlink control information from the eNB on the PDCCH until the DRX timer expires, the UE transitions to the DRX state. Further, when the UE does not receive a TA command from the eNB until the TA timer expires, the UE releases a radio resource. On the other hand, when data to be transmitted to the UE exist in the transmission buffer (illustrated as an NR transmission buffer in FIG. 4) of the gNB, the UE maintains the state in which the UE can receive data from the gNB.

In this situation, for example, when a large amount of data to be transmitted to the UE are generated and the gNB allocates data to the eNB, the eNB needs to effect transition to the state in which the UE can receive data, which consequently causes data transmission delay.

Figure 5:
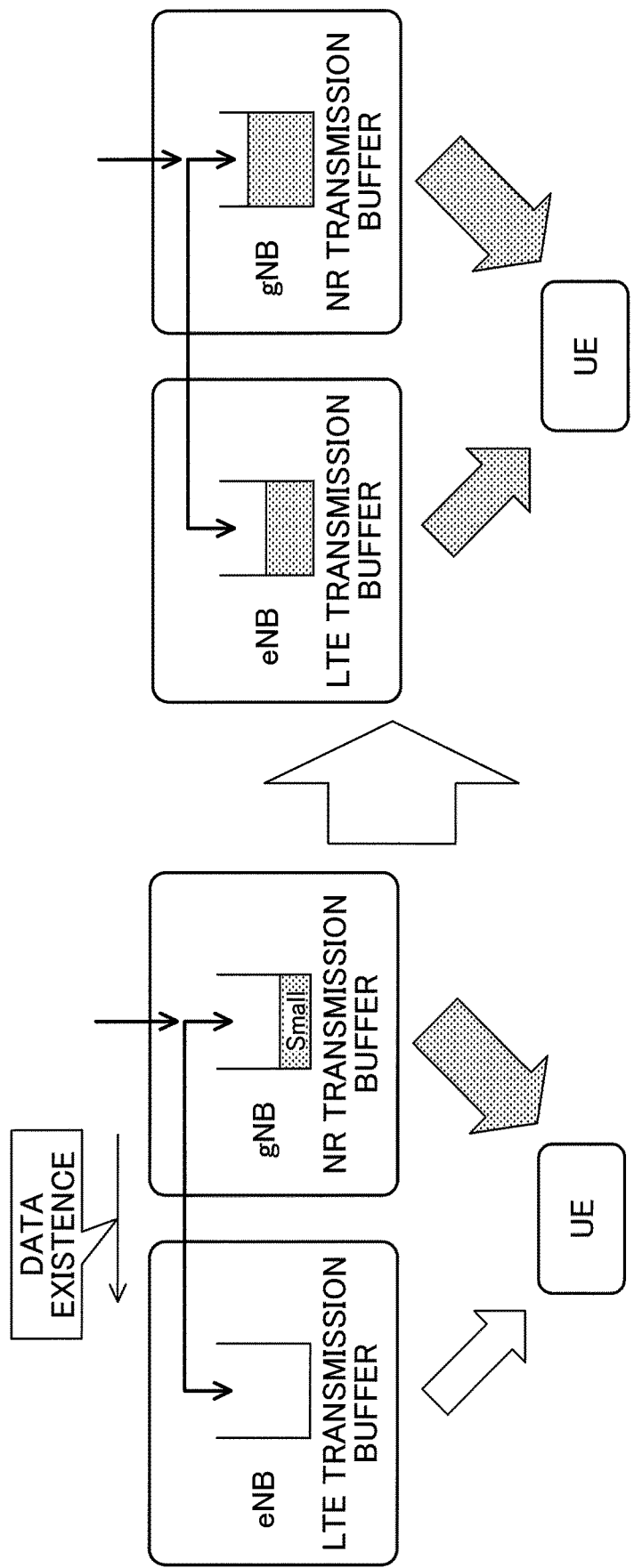
FIG. 5 is a first diagram illustrating state control of user equipment in a radio communication system according to an embodiment of the present invention.
Figure 6:
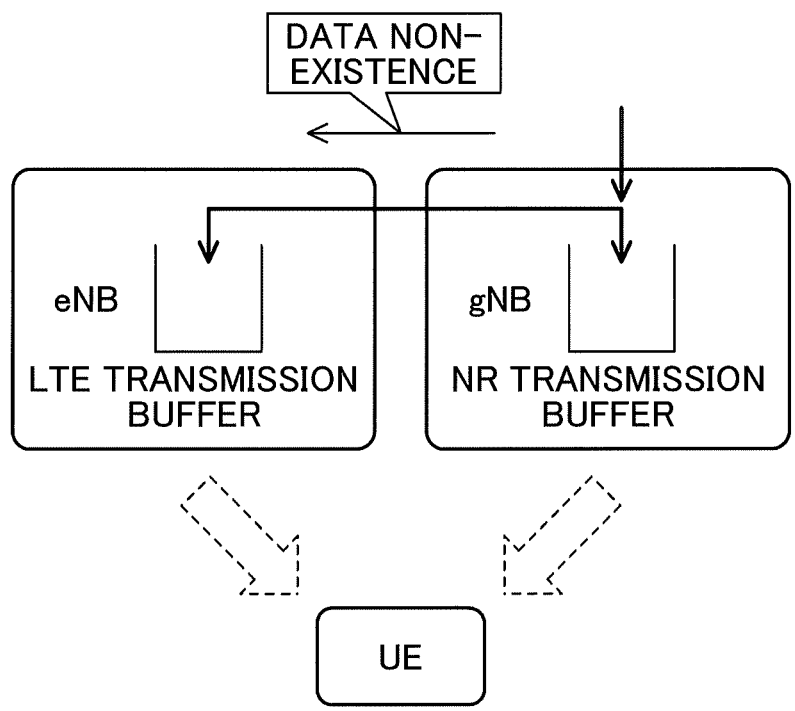
FIG. 6 is a second diagram illustrating state control of user equipment in a radio communication system according to an embodiment of the present invention.

With reference to FIGS. 5 and 6, state control of the user equipment in the radio communication system according to an embodiment of the present invention is described. As with the left side of FIG. 4, the left side of FIG. 5 illustrates that there are no data to be transmitted to the UE in the transmission buffer of the eNB, while there are data to be transmitted to the UE in the transmission buffer of the gNB. In the embodiment of the present invention, the gNB transmits to the eNB information indicating that data to be transmitted exist in the transmission buffer of the gNB (data existence). This information may be attached to data allocated by the gNB and transmitted, may be periodically transmitted, may be transmitted in response to a request from the eNB, or may be transmitted according to another trigger. When the eNB receives the information indicating that data to be transmitted exist in the transmission buffer of the gNB, the eNB maintains the state in which the UE can receive data, even if data to be transmitted do not exist in the transmission buffer of the eNB. Specifically, even if data to be transmitted do not exist in the transmission buffer of the eNB, the eNB prevents the TA timer from expiring by transmitting a TA command to the UE, and prevents the DRX timer from expiring by transmitting downlink control information to the UE on the PDCCH.

In this situation, as illustrated in the right side of FIG. 5 for example, when a large amount of data to be transmitted to the UE are generated and the gNB allocates data to the eNB, the eNB need not effect transition to the state in which the UE can receive data, because the UE is already in the state in which the UE can receive data from the eNB. Consequently, data transmission delay can be reduced.

Then, as illustrated in FIG. 6, when there are no data to be transmitted to the UE in the transmission buffer of the eNB and there are no data to be transmitted to the UE in the transmission buffer of the gNB, the gNB transmits to the eNB information indicating that data to be transmitted do not exist in the transmission buffer of the gNB (data non-existence). This information may be attached to data allocated by the gNB and transmitted, may be periodically transmitted, may be transmitted in response to a request from the eNB, or may be transmitted according to another trigger. When the eNB receives the information indicating that data to be transmitted do not exist in the transmission buffer of the gNB, it is no longer necessary for the eNB to maintain the state in which the UE can receive data. Thus, the eNB may stop transmitting a TA command and downlink control information, which has been performed even if data to be transmitted do not exist in the transmission buffer of the eNB. It should be noted that when data to be transmitted exist in the transmission buffer of the eNB at this moment, the eNB continues to maintain the state in which the UE can receive data. Consequently, battery consumption of the user equipment can be saved and a radio resource can be also saved.

FIG. 7 is an example of a data format implementing "information indicating that data to be transmitted exist (data existence)" or "information indicating that data to be transmitted do not exist (data non-existence)" which is exchanged between the base stations as described with reference to FIGS. 5 and 6. For example, information (data exists indicator) indicating whether data to be transmitted exist may be included in data to be transmitted or received by an interface such as an X2 interface, an Xn interface, an F1 interface, or the like between the base stations. The data exists indicator may be represented by one bit, where "1" may represent that data to be transmitted exist and "0" may represent that data to be transmitted do not exist.

In the description with reference to FIGS. 4-7, although expressions such as "when there are no data to be transmitted", "when data to be transmitted do not exist", and the like are used, these expressions may be replaced with "when the amount of data to be transmitted is less than or equal to a predetermined threshold" as appropriate. Similarly, expressions such as "when data to be transmitted exist" and the like may be replaced with "when the amount of data to be transmitted is larger than a predetermined threshold" as appropriate.

<Functional Configuration of Base Station>

Figure 8:
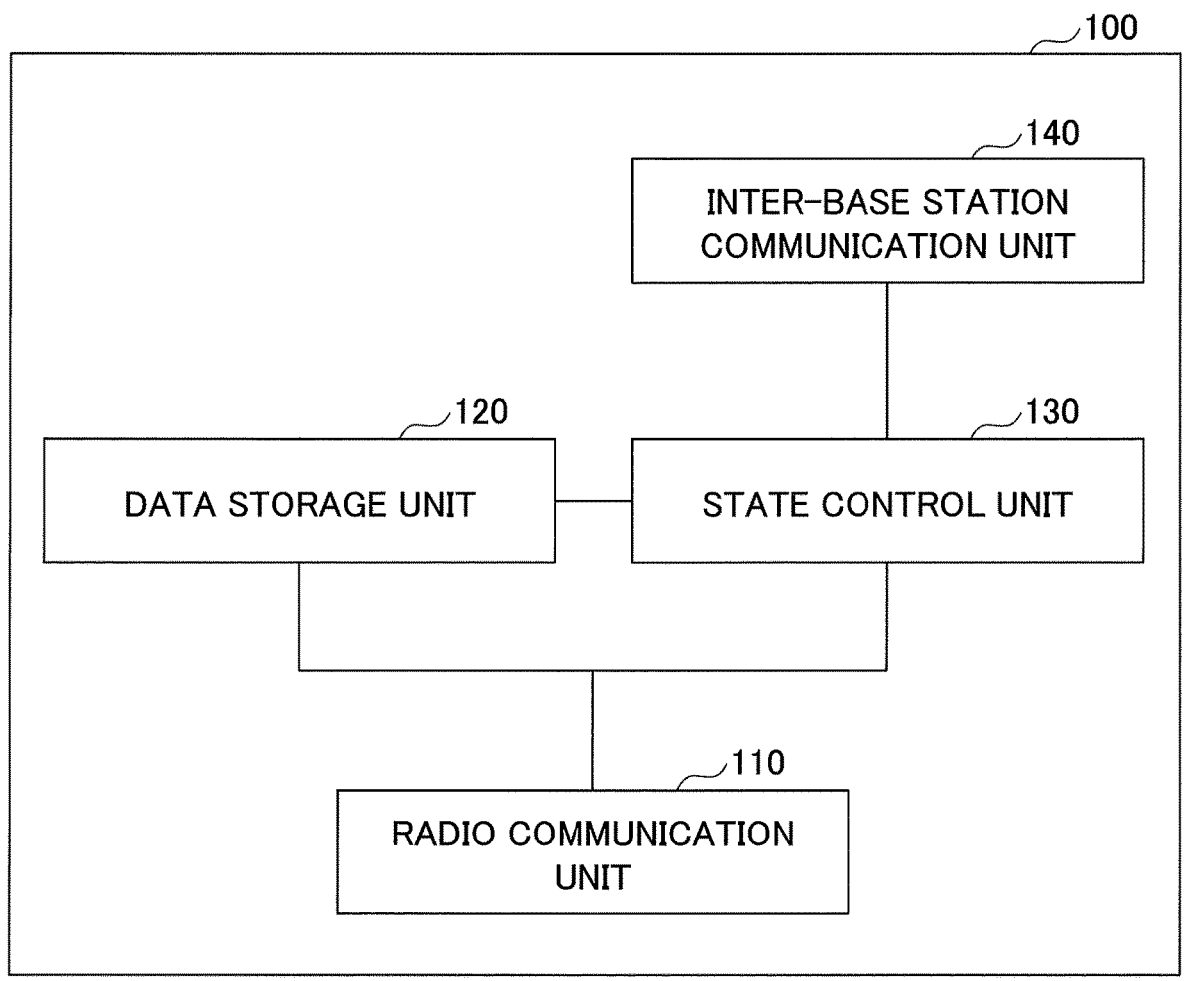
FIG. 8 is a block diagram illustrating an example of a functional configuration of a base station according to an embodiment of the present invention.

FIG. 8 is a block diagram illustrating a functional configuration of a base station according to an embodiment of the present invention. As illustrated in FIG. 8, the base station 100 includes a radio communication unit 110, a data storage unit 120, a state control unit 130, and an inter-base station communication unit 140.

First, the description is given below focusing on a base station (the eNB illustrated in FIGS. 4-6) which transmits to the user equipment 200 downlink data allocated by another base station.

The radio communication unit 110 performs radio communication with the user equipment 200. Specifically, the radio communication unit 110 transmits various downlink signals on a downlink control channel, a downlink data channel, and the like to the user equipment 200, and receives various uplink signals on an uplink control channel, an uplink data channel, and the like from the user equipment. Further, the communication control unit 110 transmits a TA command, downlink control information, and the like to control the state of the user equipment 200 based on an instruction from the state control unit 130.

The data storage unit 120 stores data to be transmitted to the user equipment 200. The data storage unit 120 may be referred to as a transmission buffer. When the other base station allocates downlink data to the base station 100, the data storage unit 120 stores the allocated data as data to be transmitted.

The state control unit 130 controls the state of the user equipment 200. The state control unit 130 can prevent the user equipment 200 from releasing a radio resource by transmitting a TA command, and prevent the user equipment 200 from transitioning to the DRX state by transmitting downlink control information on the PDCCH.

The inter-base station communication unit 140 is an interface for exchanging information between the base station 100 and the other base station. When the other base station allocates downlink data to the base station 100, the inter-base station communication unit 140 receives the downlink data allocated by the other base station. Further, the inter-base station communication unit 140 receives from the other base station information indicating whether data to be transmitted to the user equipment 200 exist. The inter-base station communication unit 140 may further transmit to the other base station information indicating whether data to be transmitted to the user equipment 200 exist in the data storage unit 120 of the base station 100.

When information indicating that data to be transmitted to the user equipment 200 exist is received from the other base station, the state control unit 130 prevents the user equipment 200 from releasing a radio resource or transitioning to a discontinuous reception state, even if the amount of to-be-transmitted data stored in the data storage unit 120 is less than or equal to a predetermined threshold.

On the other hand, when information indicating that data to be transmitted to the user equipment 200 do not exist is received from the other base station and when the amount of to-be-transmitted data stored in the data storage unit 120 is less than or equal to the predetermined threshold, the state control unit 130 cancels preventing the user equipment 200 from releasing a radio resource or transitioning to a discontinuous reception state.

Second, the description is given below focusing on a base station (the gNB illustrated in FIGS. 4-6) which allocates downlink data to another base station.

The radio communication unit 110 performs radio communication with the user equipment 200. Specifically, the radio communication unit 110 transmits various downlink signals on a downlink control channel, a downlink data channel, and the like to the user equipment 200, and receives various uplink signals on an uplink control channel, an uplink data channel, and the like from the user equipment. Further, the communication control unit 110 transmits a TA command, downlink control information, and the like to control the state of the user equipment 200 based on an instruction from the state control unit 130.

The data storage unit 120 stores data to be transmitted to the user equipment 200. The data storage unit 120 may be referred to as a transmission buffer. When the base station 100 allocates downlink data to the other base station, the data storage unit 120 stores data to be transmitted from the base station 100 to the user equipment 200, without storing downlink data allocated to the other base station and not to be transmitted from the base station 100.

The state control unit 130 controls the state of the user equipment 200. The state control unit 130 can prevent the user equipment 200 from releasing a radio resource by transmitting a TA command, and prevent the user equipment 200 from transitioning to the DRX state by transmitting downlink control information on the PDCCH.

The inter-base station communication unit 140 is an interface for exchanging information between the base station 100 and the other base station. When the base station 100 allocates downlink data to the other base station, the inter-base station communication unit 140 transmits the downlink data allocated to the other base station. Further, the inter-base station communication unit 140 transmits to the other base station information indicating whether data to be transmitted to the user equipment 200 exist in the data storage unit 120 of the base station 100. The inter-base station communication unit 140 may further receive from the other base station information indicating whether data to be transmitted to the user equipment 200 exist.

When information indicating that data to be transmitted to the user equipment 200 exist is received from the other base station, the state control unit 130 may prevent the user equipment 200 from releasing a radio resource or transitioning to a discontinuous reception state, even if the amount of to-be-transmitted data stored in the data storage unit 120 is less than or equal to a predetermined threshold.

On the other hand, when information indicating that data to be transmitted to the user equipment 200 do not exist is received from the other base station and when the amount of to-be-transmitted data stored in the data storage unit 120 is less than or equal to the predetermined threshold, the state control unit 130 may cancel preventing the user equipment 200 from releasing a radio resource or transitioning to a discontinuous reception state.

<Hardware Configuration of Base Station>

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 9:
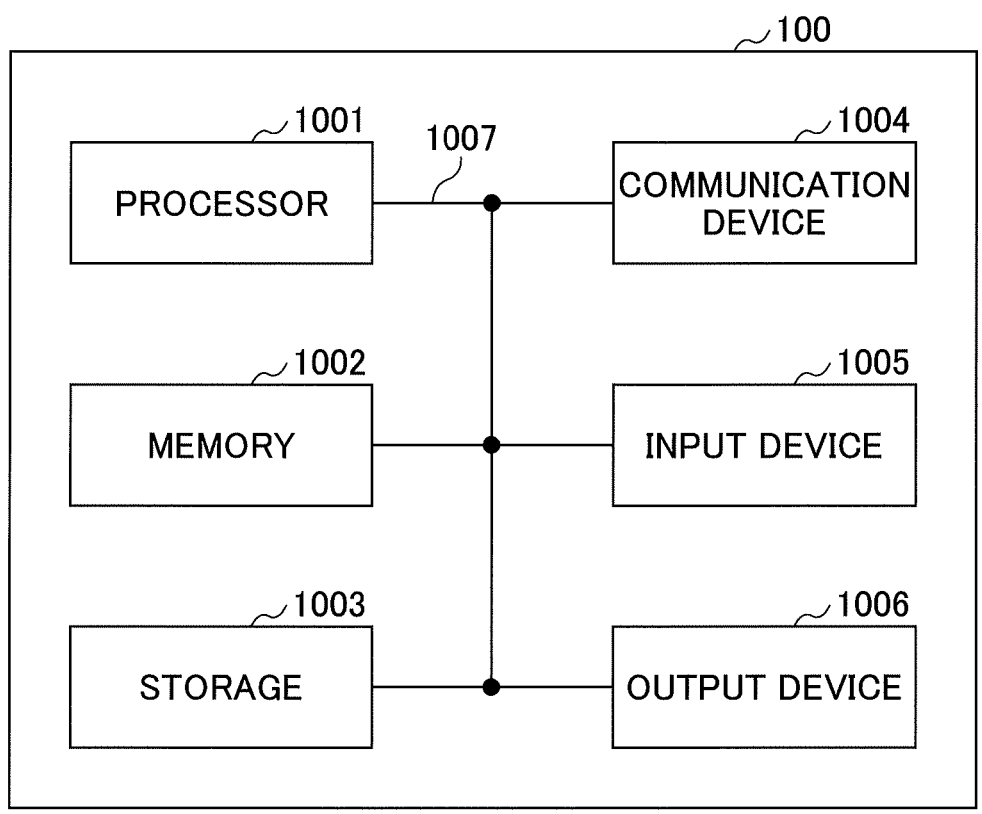
FIG. 9 is a block diagram illustrating a hardware configuration of a base station according to an embodiment of the present invention.

For example, the base station 100 according to the embodiment of the invention may function as a computer that performs a state control method according to this embodiment. FIG. 9 is a diagram illustrating an example of a hardware configuration of the base station 100 according to this embodiment. The base station 100 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 may include one or a plurality of devices illustrated in FIG. 10 or may not include some of the devices.

Each function of the base station 100 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, each of the components as described above may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the operations performed by each of the components in the base station 100 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a state control method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, each of the components as described above may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

The base station 100 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

<Supplementary Explanation>

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other suitable systems and/or next-generation systems that have functionality enhanced based on these systems.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

In the specification, a specific operation performed by the base station 100 may be performed by an upper node of the base station. In a network having one or a plurality of network nodes including the base station, it is clearly understood that various operations performed for communication with the user equipment can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

Determination may be made based on a value (0 or 1) represented by 1 bit, may be made based on a true or false value (boolean: true or false), or may be made based on comparison with a numerical value (for example, comparison with a predetermined value).

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The terms "system" and "network" used in the specification are interchangeably used.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The base station can accommodate one or more (for example, three) cells (also referred to as "sectors"). When the base station accommodates a plurality of cells, the entire coverage area of the base station can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station is also referred to as a fixed station, a NodeB, an eNodeB (eNB), an access point, a femto cell, a small cell, or the like.

In some cases, the user equipment is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "connected" or "coupled" or any modification of the term means various types of direct or indirect connection or coupling between two or more elements and can include the presence of one or more intermediate elements between two mutually "connected" or "coupled" elements. The connection or the coupling between elements may be physical connection, logical connection, or any combination thereof. When the connection or the coupling is used in the specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

A reference signal can be abbreviated to an RS, and can be also referred to as a pilot depending on a standard to be applied.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

In the configuration of each apparatus, "means" may be replaced with "unit", "circuit", "device", or the like.

The terms "include" and "including" and the modifications thereof are intended to be inclusive, similarly to the term "comprising", as long as they are used in the specification or the claims. In addition, the term "or" used in the specification or the claims does not mean exclusive OR.

A radio frame may be formed by one or more frames in the time domain. Each of one or more frames in the time domain is also referred to as a "subframe". Further, the subframe may be formed by one or more slots in the time domain. Further, the slot may be formed by one or more symbols (OFDM symbols, SC-FDMA symbols, or the like) in the time domain. Each of the radio frame, the subframe, the slot, and the symbol represents a time unit in which a signal is transmitted. The radio frame, the subframe, the slot, and the symbol may have different corresponding names. For example, in an LTE system, the base station performs scheduling to allocate a radio resource (a frequency bandwidth, transmission power, and/or the like which can be used by each mobile station) to each mobile station. A minimum time unit of scheduling may be referred to as a "transmission time interval (TTI)". For example, one subframe may be referred to as a TTI, a plurality of consecutive subframes may be referred to as a TTI, or one slot may be referred to as a TTI. A resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be formed by one or more resource blocks. The structure of the radio frame as described above is merely an example, and the number of subframes included in the radio frame, the number of slots included in the subframe, the number of symbols and resources blocks included in the slot, and the number of subcarriers included in the resource block can be modified in any manner.

While the embodiments of the present invention are described in detail, the present invention is not limited to the specifically disclosed embodiments and variations and modifications may be made within the scope of the present invention as claimed.

DESCRIPTION OF NOTATIONS

10 radio communication system
100, 101, 102 base station
110 radio communication unit
120 data storage unit
130 state control unit 140 inter-base station communication unit
200 user equipment

The invention claimed is:

1. A first base station, comprising:
a reception unit configured to receive information indicating whether data to be transmitted from a second base station to a terminal exist from the second base station, when the data to be transmitted to the terminal are distributed by the second base station; and
a control unit configured to perform discontinuous reception (DRX) control for the terminal, when information indicating the data to be transmitted from the second base station to the terminal exist is received,
wherein the information indicating whether the data to be transmitted from the second base station to the terminal exist is represented by one bit and is transmitted being attached to the data to be distributed by the second base station, and
wherein the control unit is further configured to control transmission of downlink control information to prevent the terminal from transitioning to a DRX state.

2. The first base station as claimed in claim 1, further comprising:
a data storage unit configured to store the data to be transmitted to the terminal which are distributed by the second base station,
wherein when the information indicating the data to be transmitted to the terminal exist is received, the control unit prevents the terminal from transitioning to a discontinuous reception state, even if an amount of to-be-transmitted data stored in the data storage unit is less than or equal to a predetermined threshold, and
when information indicating the data to be transmitted from the second base station to the terminal do not exist is received and when the amount of to-be-transmitted data stored in the data storage unit is less than or equal to the predetermined threshold, the control unit cancels preventing the terminal from transiting to the discontinuous reception state.

3. The first base station as claimed in claim 1, wherein the control unit prevents a timer for managing time when the terminal transitions to the discontinuous reception state from expiring by transmitting downlink control information to the terminal.

4. The first base station as claimed in claim 2, wherein the control unit prevents a timer for managing time when the terminal transitions to the discontinuous reception state from expiring by transmitting downlink control information to the terminal.

5. A state control method in a first base station, comprising the steps of:
receiving information indicating whether data to be transmitted from a second base station to a terminal exist from the second base station, when the data to be transmitted to the terminal are distributed by the second base station; and
performing discontinuous reception (DRX) control for the terminal, when information indicating the data to be transmitted from the second base station to the terminal exist is received,
wherein the information indicating whether the data to be transmitted from the second base station to the terminal exist is represented by one bit and is transmitted being attached to the data to be distributed by the second base station, and
wherein the method further comprises performing control of transmission of downlink control information to prevent the terminal from transitioning to a DRX state.

* * * * *